(12) United States Patent
Bridges

(10) Patent No.: US 9,724,630 B2
(45) Date of Patent: Aug. 8, 2017

(54) PLEATED WOVEN WIRE FILTER

(71) Applicant: PECOFacet (Houston), LLC, Franklin, TN (US)

(72) Inventor: Frank Lynn Bridges, Lake Charles, LA (US)

(73) Assignee: PECOFacet (Houston), LLC, Franklin, TN (US)

( * ) Notice: Subject to any disclaimer, the term of this patent is extended or adjusted under 35 U.S.C. 154(b) by 210 days.

(21) Appl. No.: 14/251,633

(22) Filed: Apr. 13, 2014

(65) Prior Publication Data

US 2015/0165350 A1    Jun. 18, 2015

Related U.S. Application Data

(63) Continuation-in-part of application No. 13/188,466, filed on Jul. 22, 2011, now abandoned.

(51) Int. Cl.

| | |
|---|---|
| *B01D 39/10* | (2006.01) |
| *B01D 29/66* | (2006.01) |
| *B01D 29/11* | (2006.01) |
| *B01D 29/21* | (2006.01) |

(52) U.S. Cl.
CPC ............ *B01D 39/10* (2013.01); *B01D 29/111* (2013.01); *B01D 29/21* (2013.01); *B01D 29/66* (2013.01); *B01D 2201/0415* (2013.01); *B01D 2201/293* (2013.01); *B01D 2201/34* (2013.01)

(58) Field of Classification Search
CPC ...... B01D 29/07; B01D 29/111; B01D 29/66; B01D 39/10; B01D 2201/0415; B01D 2201/293; B01D 2201/291; B01D 2201/298; B01D 2201/34; B01D 46/2414
See application file for complete search history.

(56) References Cited

U.S. PATENT DOCUMENTS

| | | | | |
|---|---|---|---|---|
| 3,407,252 A | * | 10/1968 | Pall ...................... | B01D 29/111 210/493.5 |
| 5,944,197 A | * | 8/1999 | Baltzer .................. | B01D 46/10 209/400 |
| 6,387,142 B1 | * | 5/2002 | Pieciak .................. | B01D 29/21 55/360 |

(Continued)

*Primary Examiner* — Bobby Ramdhanie
*Assistant Examiner* — Donovan C Bui-Huynh
(74) *Attorney, Agent, or Firm* — Reinhart Boerner Van Deuren P.C.

(57) ABSTRACT

A removable, reusable, pleated woven wire filter comprising: (a) a stainless steel perforated core having one-half-inch stainless steel round bar reinforcement rings welded to one-half-inch stainless steel round bar cross bars to create bar-ring junctures, and having 11-gauge stainless steel attachment clips welded to each end of the perforated core; (b) a three-layer stainless steel pleated woven wire filter media wrapped around the perforated core, the filter media having spaced apart pleats with external peaks, and an external filter media surface comprising the external peaks of the pleats; (c) a stainless steel flattened expanded metal shroud adjacent to and encircling the external peaks, and (d) a stainless steel top end cap base and a stainless steel bottom end cap base connected to the metal shroud, both cap bases sealed against top and bottom ends of the filter media with a stainless steel adhesive sealant rated at 2,000 degrees Fahrenheit.

9 Claims, 19 Drawing Sheets

(56) References Cited

U.S. PATENT DOCUMENTS

2009/0057221 A1* 3/2009 Bridges ................ B01D 29/111
                                                                       210/445

2012/0187039 A1* 7/2012 Bridges ................ B01D 29/111
                                                                       210/457

\* cited by examiner

PLEATED WOVEN WIRE FILTER

CROSS-REFERENCES TO RELATED APPLICATIONS

This patent application is a continuation-in-part of patent application Ser. No. 12/197,840, filed Aug. 25, 2008, entitled "Pleated Woven Wire Filter", and listing as the inventor Frank Lynn Bridges. This continuation-in-part patent application also claims the benefit of provisional patent application Ser. No. 60/968,532, filed Aug. 28, 2007, entitled "Pleated Woven Wire Filter", and listing as the inventor Frank Lynn Bridges.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION (1) Field of the Invention

The invention relates to a back-washable filter for use in petrochemical processes involving corrosive high temperature liquid or gas streams with high concentrations of solids wherein the filter requires frequent backwashing.

(2) Description of the Related Art

U.S. Pat. No. 6,986,842 ("the Bortnik patent"), which is incorporated herein by this reference, discloses a fluid filter element having a pleated filter media with spaced apart pleats, an external filter media surface comprising the external peaks of the pleats, and a flexible foam filter media sleeve in contact with and extending between the pleats of the peaks of the external filter media surface. The filter media sleeve maintains the spacing between the external peaks of the pleats of the pleated filter media. The pleated filter media is for fluid applications and includes fragile material media layers between wire meshes, but the patent states that the number of media layers is "typically from 1-10 layers" (Column 3, lines 64-65). The Bortnik patent does not disclose means for preventing the expansion of the pleated filter media radially against the filter media sleeve during a backwash cycle, does not disclose means for sealing between the pleats and the ends of the filter, does not disclose using only a single layer of pleated woven-wire as a filter media, and discloses no a) optimal number of pleats to the circumference of the cylinder, b) optimal radial depth of each pleat, and c) optimal axial length of the pleats.

U.S. Pat. No. 4,786,670 (the "Tracey" patent), which is incorporated herein by this reference, discloses a compressible non-asbestos high-temperature sheet material usable for gaskets. U.S. Pat. No. 5,376,278 (the "Salem" patent), which is incorporated herein by this reference, discloses a filter used in a process vessel in a nuclear power generating plant; that is, a filter and a method for separating charged particles from a liquid stream. U.S. Pat. No. 5,795,369 (the "Taub" patent), which is incorporated herein by this reference, discloses a fluted filter media for a fiber bed mist eliminator, including "a layer of fluted filter media 48 and a support structure. The support structure preferably includes an inner cage 50, and an outer cage 52." U.S. Pat. No. 6,962,256 (the "Nguyen" patent), which is incorporated herein by this reference, discloses a plastic molded center tube assembly.

Most of the existing reusable back-washable filters are offered in small diameters with limited surface areas. Thus a user must install large quantities of such filters in a single pressure vessel, in order to accommodate the high flow rates and heavy contaminant loadings associated with industrial process streams. Due to the material composition and design structure of most of such filters, the flow rates of known liquids and gases through those filters are low in relation to their surface area. Available gasket materials for sealing the filters are limited because the gaskets must survive high temperatures and corrosive chemicals. Most back-washable filters contain multiple filter elements, as in the Bortnik patent. Such multi-filter element filters suffer from at least two major deficiencies: 1) a limited surface area of the cylindrical designs which restrict flow in both the filtrate and backwash cycles, and 2) the backwash cycle is less efficient because the close proximity of filter elements in a multi-element filter results in the back-flushed contaminant collecting on the adjacent filter elements, and thereby increasing the backwash cycle time.

In light of the foregoing, a need remains for a reusable back-washable filter for use in petrochemical processes involving corrosive high temperature liquid or gas streams with high concentrations of solids wherein the filter requires frequent backwashing. More particularly, a need still remains for a reusable back-washable filter having a) means to keep the filter from radially expanding during a backwash cycle, b) means for sealing between the pleats and the ends of the cylinder containing the pleated woven-wire, c) optimized number of pleats to the circumference of the cylinder, d) optimized radial depth of each pleat, and e) optimized axial length of the pleats.

BRIEF SUMMARY OF THE INVENTION

A removable, reusable, pleated woven wire filter, configured for removing particulate material from a heavy coker gas oil process stream, the process stream containing any of asphaltenes, heavy catalytic-cracked petroleum distillates, catalytic-cracked petroleum clarified oils, residual heavy petroleum coker gas oil, vacuum gas oil, naptha, coke fines, $H_2S$. Sulphur. Butane, Butene, and Chrysene, the filter comprising: (a) a reinforced 11-gauge stainless steel perforated core having one-half-inch stainless steel round bar reinforcement rings welded to one-half-inch stainless steel round bar cross bars to create bar-ring junctures, and having 11-gauge stainless steel attachment clips welded to each end of the perforated core; (b) a three-layer stainless steel pleated woven wire filter media wrapped around the perforated core, attached to the perforated core by 18-gauge stainless steel tie wires at each of the bar-ring junctures; and further attached at each end of the perforated core by attachment clips welded to each open end of the perforated core; the filter media having spaced apart pleats with external peaks, and an external filter media surface comprising the external peaks of the pleats; (c) a stainless steel flattened expanded metal shroud adjacent to and encircling the external peaks, and (d) a one-inch-thick stainless steel top end cap base and a three-quarter-inch-thick stainless steel bottom end cap base connected to the metal shroud, both cap bases sealed against top and bottom ends of the filter media with a stainless steel adhesive sealant rated at 2,000 degrees Fahrenheit, wherein the wire filter is further adapted for filtering a process stream operating between 300 and 800 degrees Fahrenheit, and between 150 psig and 500 psig, and is further adapted for being backwashed with a backwash purge pressure that can vary from 100 psig to 200 psig.

In another feature of the invention, a required square footage of filter media, determined by flow rate calculations for the given process, is divided by a number between 33 and 34 to determine the inside diameter of the perforated core.

In still another feature of the invention, the filter media consists of: a) an inner layer of woven wire metal mesh; b) a middle layer of stainless steel micronic filter cloth; and c) an outer layer of woven wire metal mesh, wherein the inner and outer layers support the filter cloth.

DETAILED DESCRIPTION OF THE INVENTION

Figure 1:
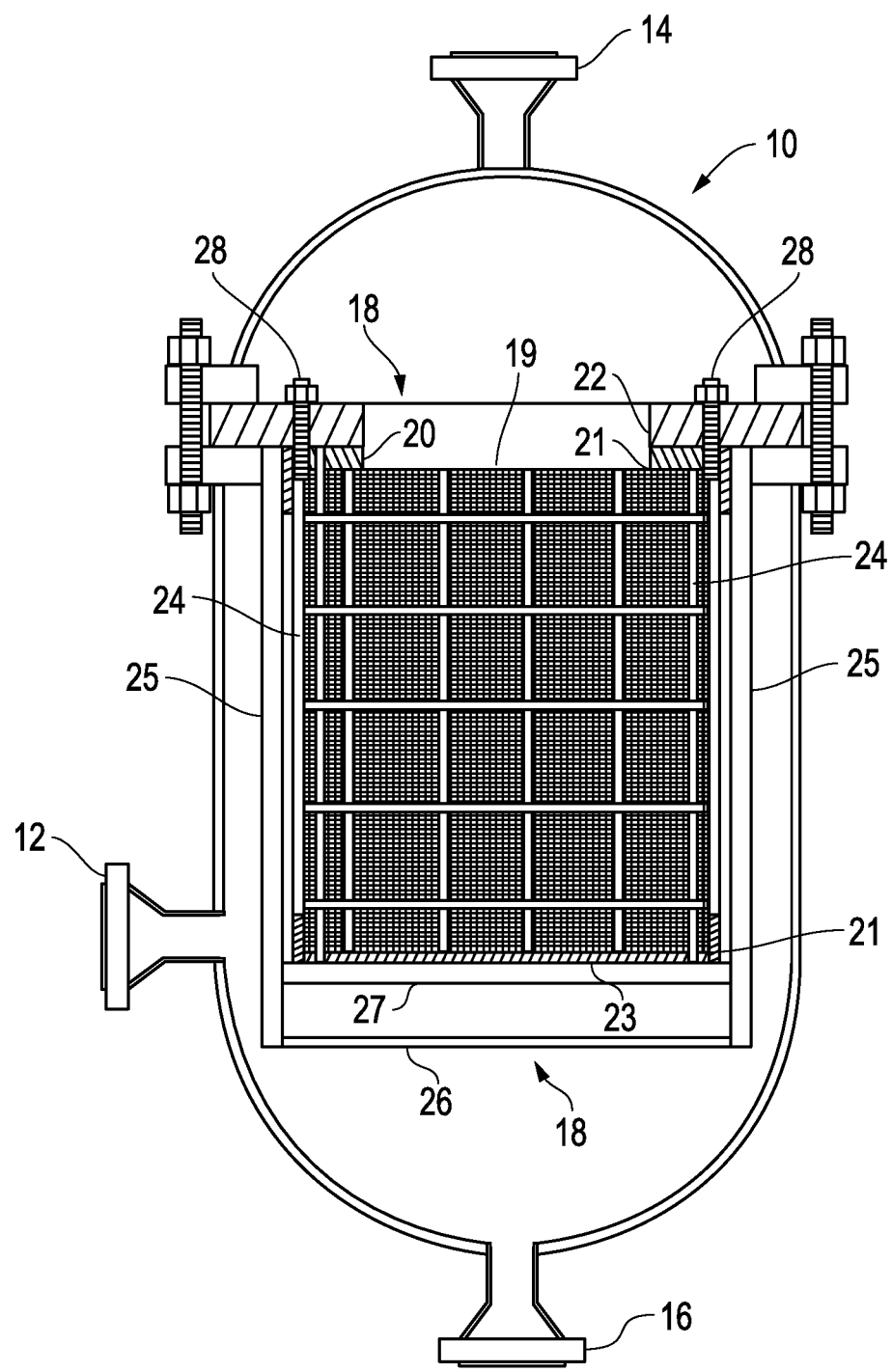
FIG. 1 is a side view of the filter of the present invention in typical process vessel.

In FIG. 1, a process vessel 10 contains an inlet nozzle 12, an outlet nozzle 14, a backwash nozzle 16, and a filter 18, built according to the present invention. Dirty fluid enters the process vessel 10 through the inlet nozzle 12, and flows from outside of the filter 18, through a filter media 19. The filter media 19 is made of a three layer stainless steel pleated woven wire. After the dirty fluid flows through the filter media 19, it then flows through a stainless steel top end cap 20, and through a 1½ inch thick stainless steel top flange plate 22, exiting through the outlet nozzle 14. During backwashing, liquid flows into the outlet nozzle 14, through the filter media 19, out through a stainless steel bottom end cap 23, and out through the backwash nozzle 16. In the preferred embodiment, the filter media 19 comprises three layers of stainless steel pleated wire with a minimum pleat depth of four inches and a minimum pleat length of forty-eight inches, providing 2.67 square feet of surface area per pleat, consisting of an inner layer of 8-mesh, 0.025 inch wire diameter stainless steel woven wire metal mesh, a middle layer of stainless steel micronic filter cloth, and an outer layer of 20-mesh, 0.014 inch wire diameter stainless steel woven wire metal mesh. In the preferred embodiment, the stainless steel micronic filter cloth is the twilled dutch weave manufactured by Southwestern Wire Cloth, having a mesh count per inch of 165×1400 with wire diameters of 0.0028 inch in the warp direction, and 0.0016 inch diameter in the shute direction. This micronic layer of wire has an absolute rating of 16 microns, and a nominal rating of 10 microns. The inner and outer layers of stainless steel woven wire function as a support structure for the stainless steel micronic filter cloth. A stainless steel adhesive sealant 21, rated at 2,000 F, functions as a fluid containment barrier and structural reinforcement bond connecting a reinforced 11-gauge stainless steel perforated core 62 (shown in FIG. 7A), the filter media 19, a stainless steel 21-gauge tie wire 83 (shown in FIG. 17), the end caps 20, 23, and eight cap tie rods 24. The adhesive sealant 21 seals the ends of the filter media 19 against the top end cap 20 and the bottom end cap 23. The adhesive sealant 21 can endure temperatures up to 2,000 F, and has the flexibility and compressibility to accept the rigid wire members of the filter media 19, and provides a positive seal against fluid by-pass, while offering a high operating temperature of 2,000 degrees Fahrenheit. In the preferred embodiment, the adhesive sealant 21 is the DURABOND brand, sold by Cotronics Corp., Brooklyn, N.Y.

The eight cap tie rods 24 are ½ inch O.D. stainless steel vertical round bar rods with threaded ends which attach to the top end cap 20 and the bottom end cap 23 in pre-drilled and threaded holes, and thus keep pressure against the ends of the filter media 19. Each cap 20 and 23 has a two-inch wide×11-gauge thick stainless steel lip. Angle iron legs 25, which are 2 inch×2 inch×¼ inch thick carbon steel, are welded to the top flange plate 22, to a ½ inch thick carbon steel bottom ring 26, and to a 2 inch×2 inch×¼ inch carbon steel angle iron horizontal support 27. The top flange plate 22 is sized to fit the particular process vessel 10. Sixteen SA-193-B7 stud bolts 28 connect the top flange plate 22 to the top end cap 20. Once the filter assembly is attached to the top flange plate 22, the horizontal support 27 is welded into position immediately adjacent to the underside of the bottom end cap 23 to provide additional seal support pressure for the wire fins of the filter media 19 during operation, when vibration and movement could occur during the filter and backwash cycles.

Figure 2:
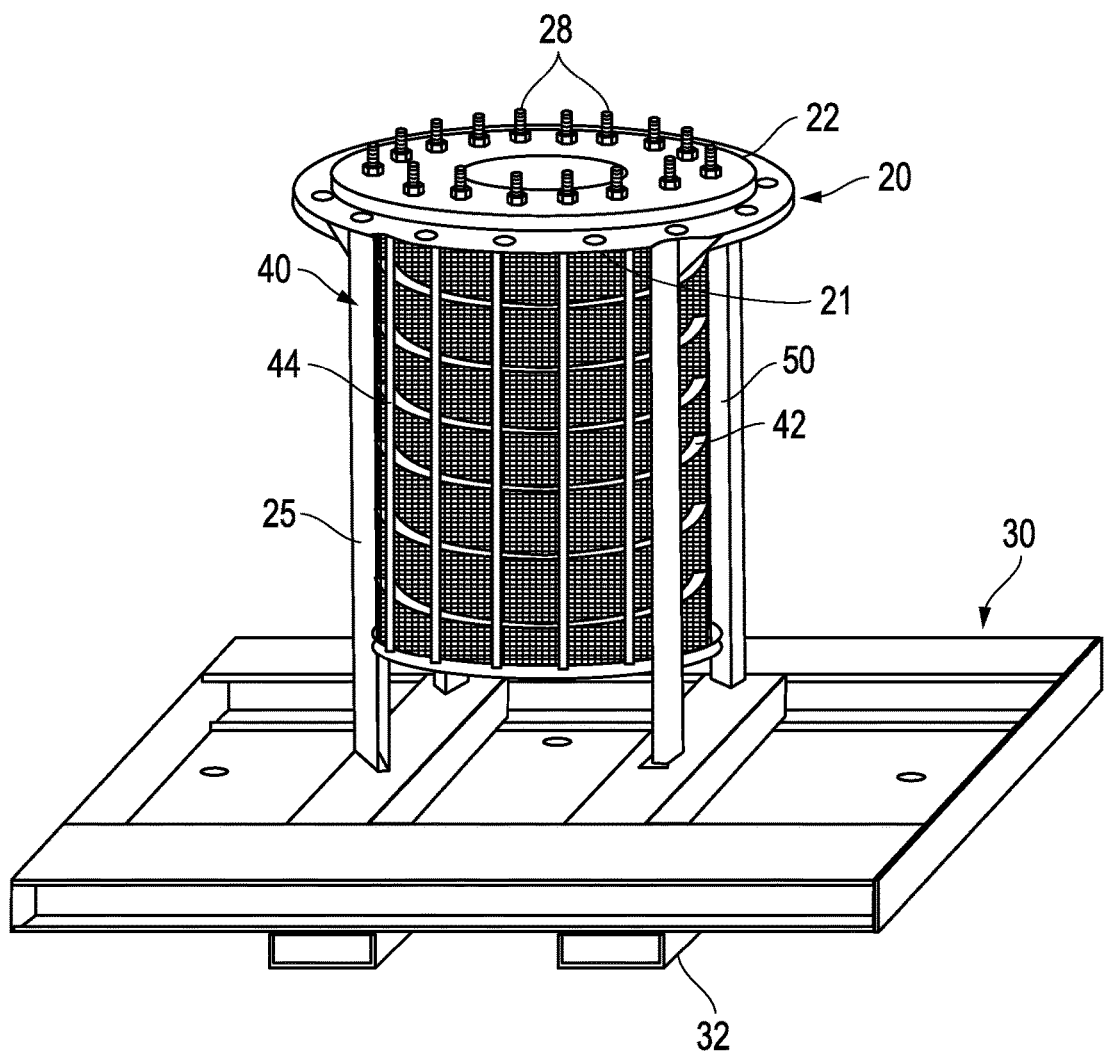
FIG. 2 is a perspective view of the filter.

Referring now to FIG. 2, the filter 18 is ideally mounted on a shipping skid 30 for transportation to the location of a process vessel 10. The shipping skid 30 includes insert points 32 for a forklift. The filter media 19 has two separate outer support structures connected to it, a first outer support structure 40, shown in more detail in FIG. 3, and a second outer support structure 50, shown in more detail in FIG. 4. In one embodiment a stainless steel first outer support structure 40 supports the filter media 19 during backwashing. The first outer support structure 40 includes a series of 1 inch wide×11-gauge thick stainless steel horizontal bands 42 that are welded to four 1 inch wide×11-gauge thick stainless steel metal flat bar vertical supports 44. Ideally, the horizontal bands 42 are spaced about a foot apart. The first outer support structure 40 minimizes the chances of pleat deformation and woven wire deterioration of the filter media 19 from abrasion during pleat movement.

Figure 3A:
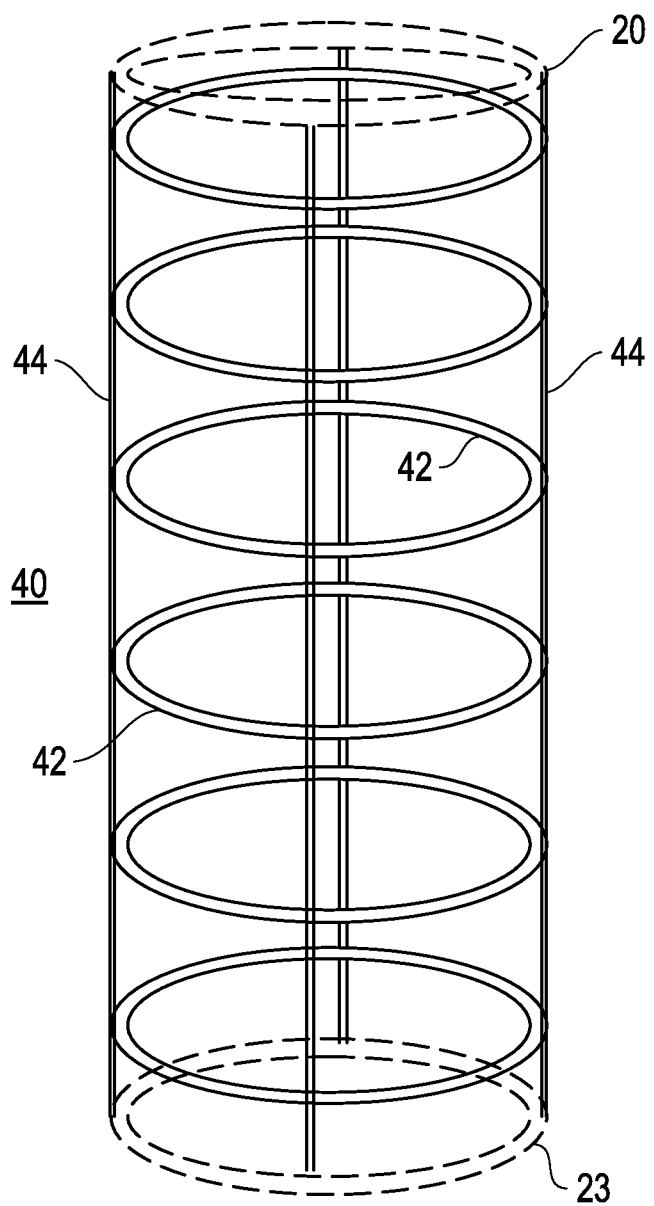
FIG. 3A is a perspective view of a first outer support structure for the filter.

Referring now to FIG. 3, the first outer support structure 40 does not connect to the top and bottom end caps 20, 23, which are shown in dotted lines merely to show their locations with respect to the first outer support structure 40.

Figure 3B:
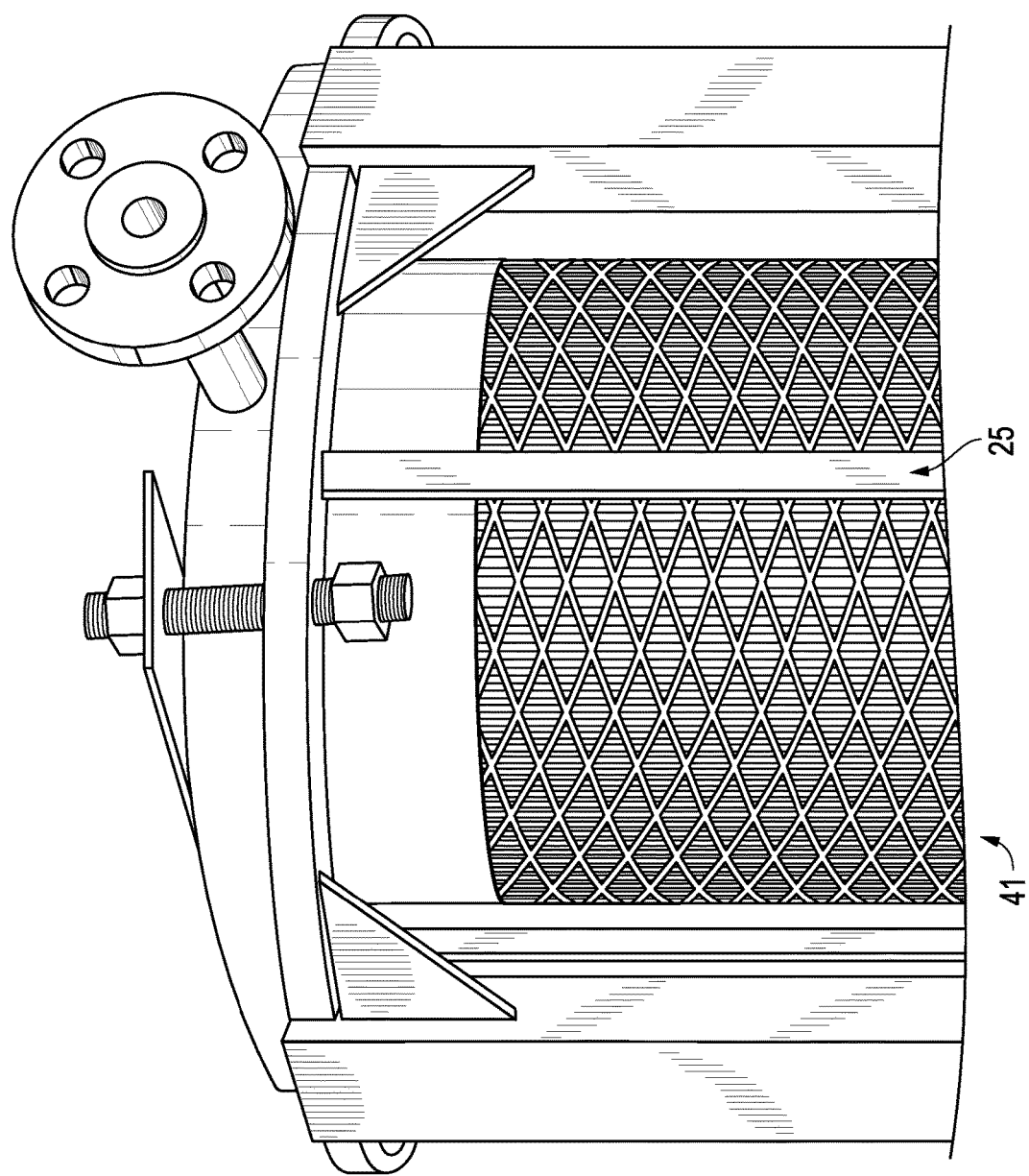
FIG. 3B shows a first outer support structure as a stainless steel flattened expanded metal shroud.

Referring now to FIG. 3B, in the preferred embodiment, a first outer support structure 41 is a stainless steel flattened expanded metal shroud with 80% open area. The first outer support structure 41 includes the angle iron legs 25. The first outer support structure 41 provides backwash support for the filter media 19.

Figure 3C:
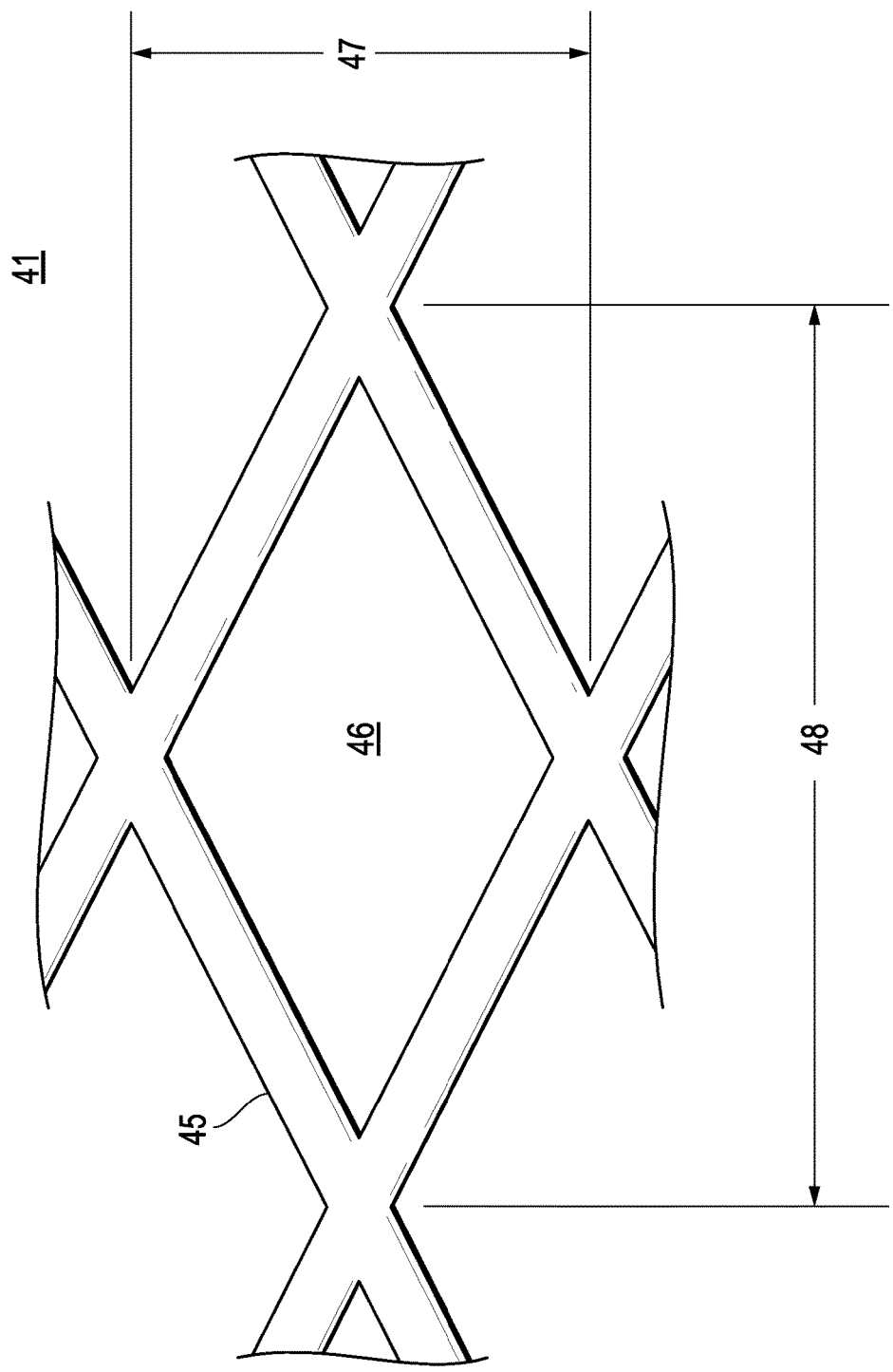
FIG. 3C shows one of the diamond configurations that comprise the first outer support structure.

Referring now to FIG. 3C, the first outer support structure 41 further comprises a series of diamond configurations 46 made of strands 45. Each diamond configuration 46 has a height 47 and a width 48. In the preferred embodiment, the height 47 is 1.33 inches, and the width 48 is 3.15 inches. This results in an opening for each diamond configuration having a height of 1.062 inches, and a width of 2.75 inches. The thickness of each strand 45 is 0.050 inches.

Figure 4:
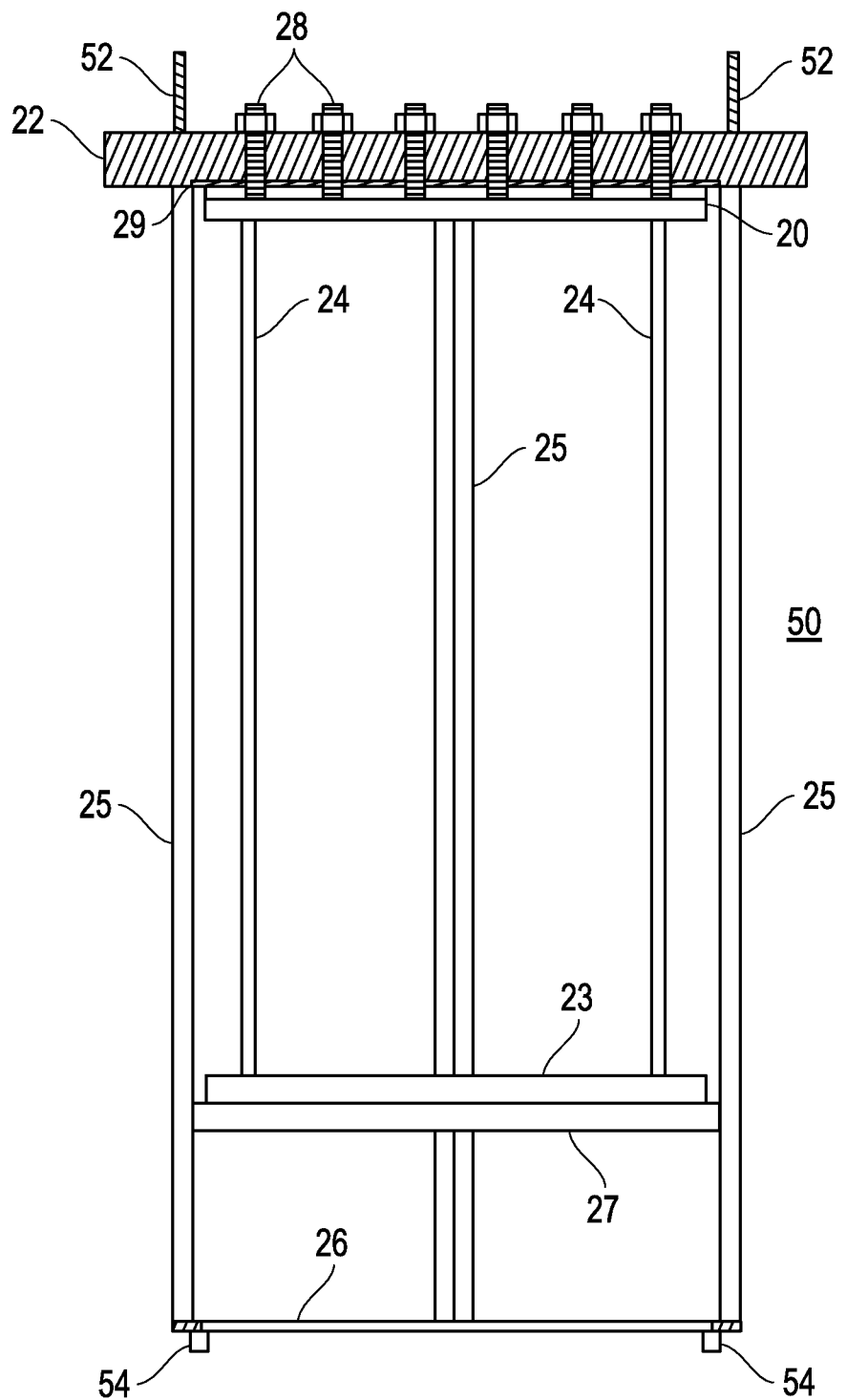
FIG. 4 is a side view of part of a second outer support structure for the filter.

Referring now to FIG. 4, a second outer support structure 50 includes the top flange plate 22, with two 3 inch×3 inch×½ inch thick stainless steel lifting lugs 52 welded to it. The two lifting lugs 52 aid in lifting the heavy filter 18 into and out of the process vessel 10. The second outer support structure 50 also includes the bottom ring 26, which has four carbon steel 1 inch O.D.×1 inch long round bar risers 54 welded to it, to keep the entire filter assembly off the ground during manufacturing. The second outer support structure 50 includes the eight cap tie rods 24 threaded into a top end cap base 56 of the top end cap 20. The top end cap base 56 is made of one-inch-thick stainless steel. The eight cap tie rods 24 are also threaded into a bottom end cap base 58 of the bottom end cap 23. The bottom end cap base 58 is made of ¾ inch thick stainless steel. The second outer support structure 50 also includes the angle iron legs 25 welded to the top flange plate 22, to the bottom ring 26, and to the horizontal support 27.

Figure 5:
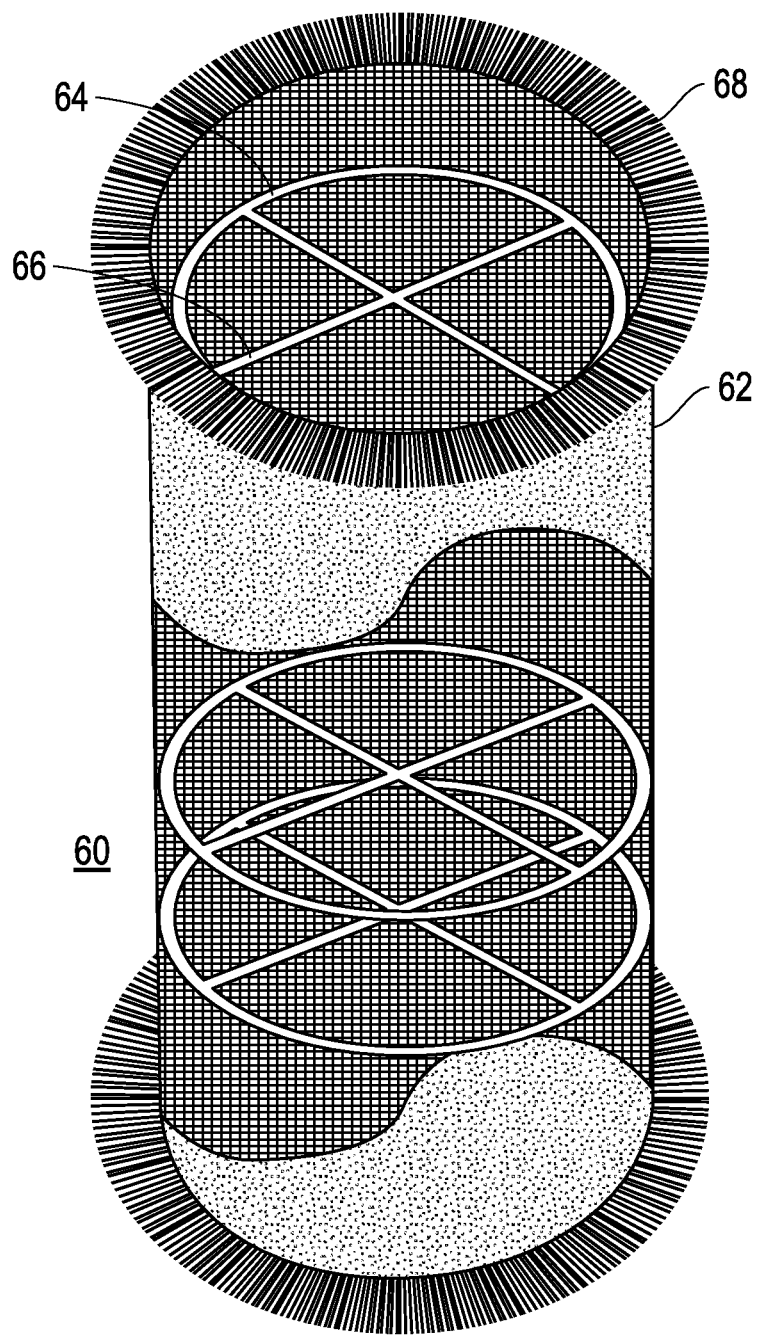
FIG. 5 is a perspective view of an inner support structure for the filter.

Referring now to FIG. 5, an inner support structure 60 includes a reinforced 11-gauge stainless steel perforated core 62 that contains one-half-inch O.D. stainless steel round bar rings 64 with ½ inch O.D. stainless steel round bar cross-braces 66. At the top of the perforated core 62 are 11-gauge stainless steel clips 68 that are bent over to hold in place the filter media 19. In the preferred embodiment the perforated core 62 has a minimum I.D. of ten inches and a minimum length of forty-eight inches, the perforated holes are ⅛ inch in diameter, and spaced 3/16 inch on staggered centers, and there are a minimum of four rings 64, having the cross-braces 66, equally spaced at a maximum of 10 inches apart on the perforated core 62.

Figure 6:
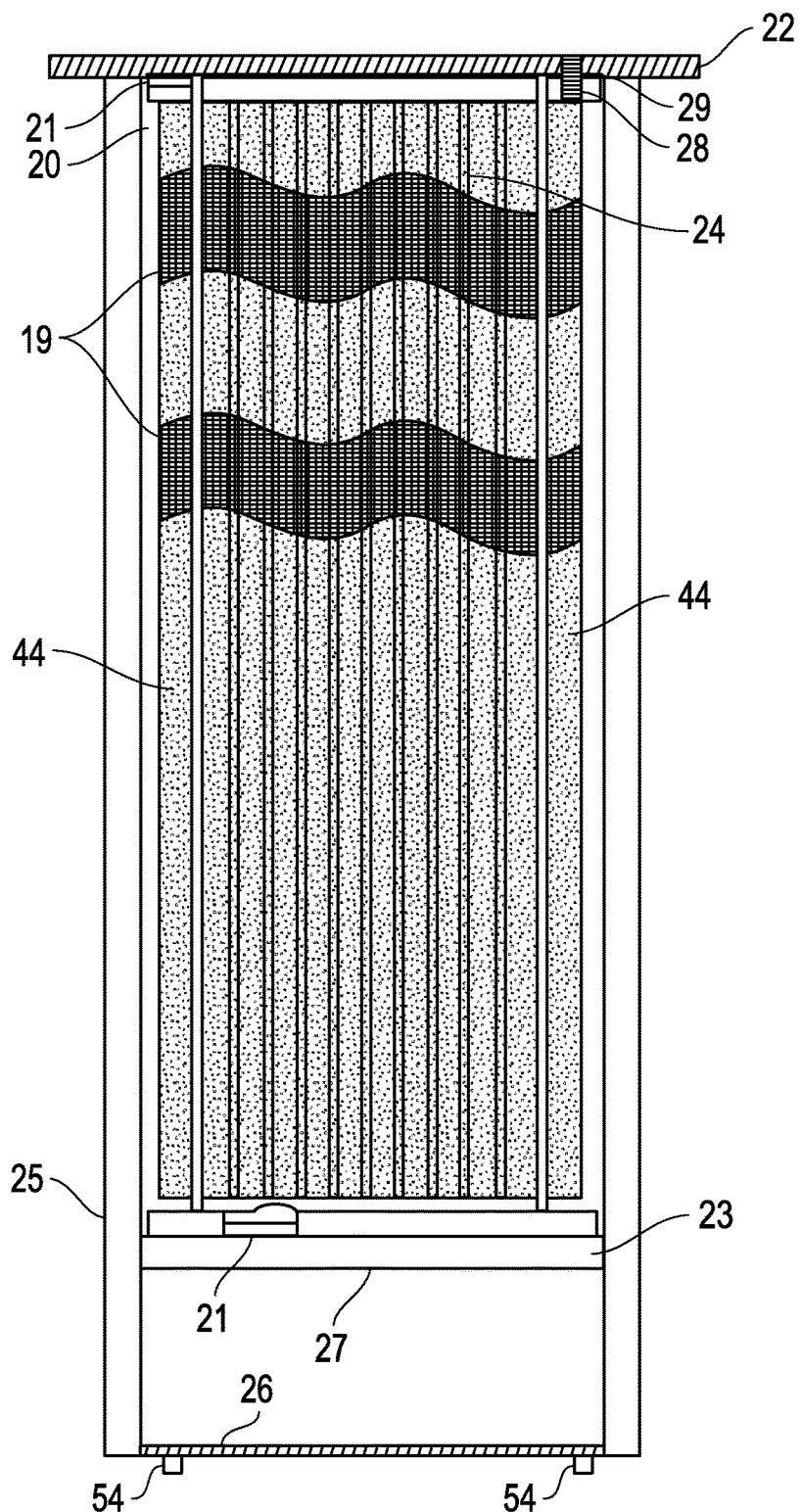
FIG. 6 is a side view of the filter showing its second outer support structure and its inner core.

Referring now to FIG. 6, the second outer support structure 50 of FIG. 4 is shown together with the filter media 19 and a Flexitallic® brand spiral-wound gasket 29 located between the top flange plate 22 and the top end cap 20.

Figure 7A:
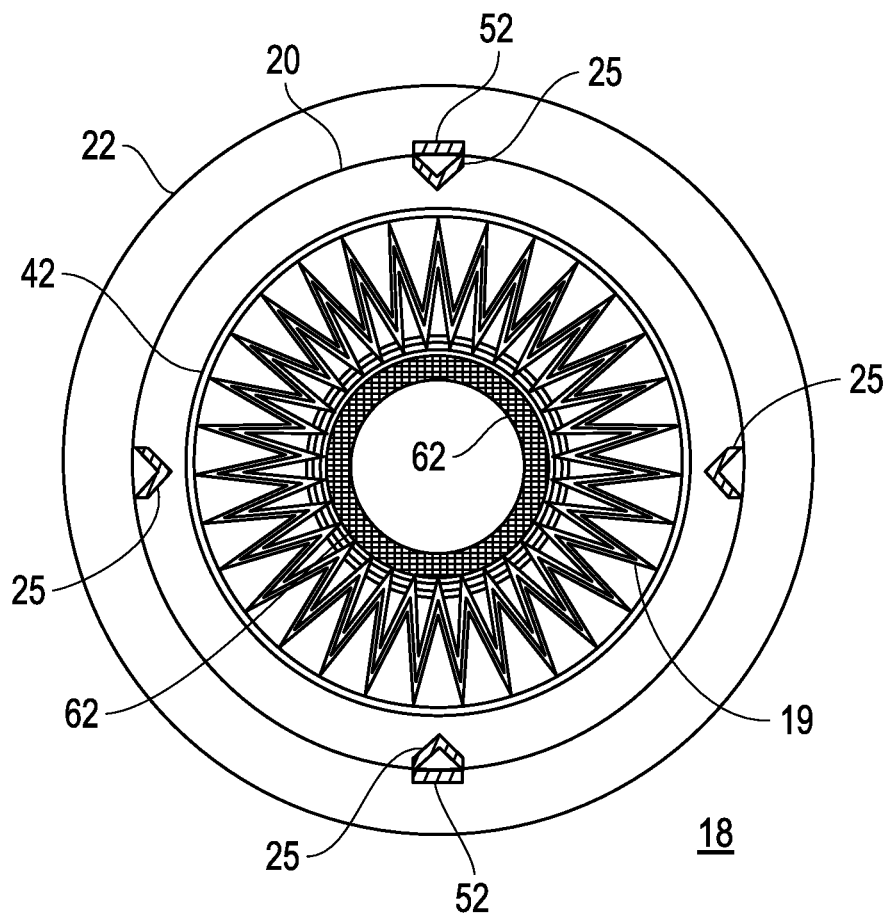
FIG. 7A shows the top end cap of the filter, and a plan view of the top of the outer support structure for the filter.
Figure 7B:
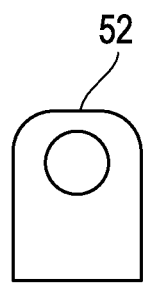
FIG. 7B shows one of the lifting lugs of the filter.

Referring now to FIG. 7A, a top plan view of the filter 18 shows the perforated core 62 surrounded by the filter media 19 surrounded by the horizontal bands 42. In the preferred embodiment the first outer support structure 41, shown in FIGS. 15 and 16, replaces the first outer support structure 40. Also shown in FIG. 7A is the top end cap 20, the top flange plate 22, and the lifting lugs 52. One of the lifting lugs 52 is shown in a separate side view in FIG. 7B.

Figure 8:
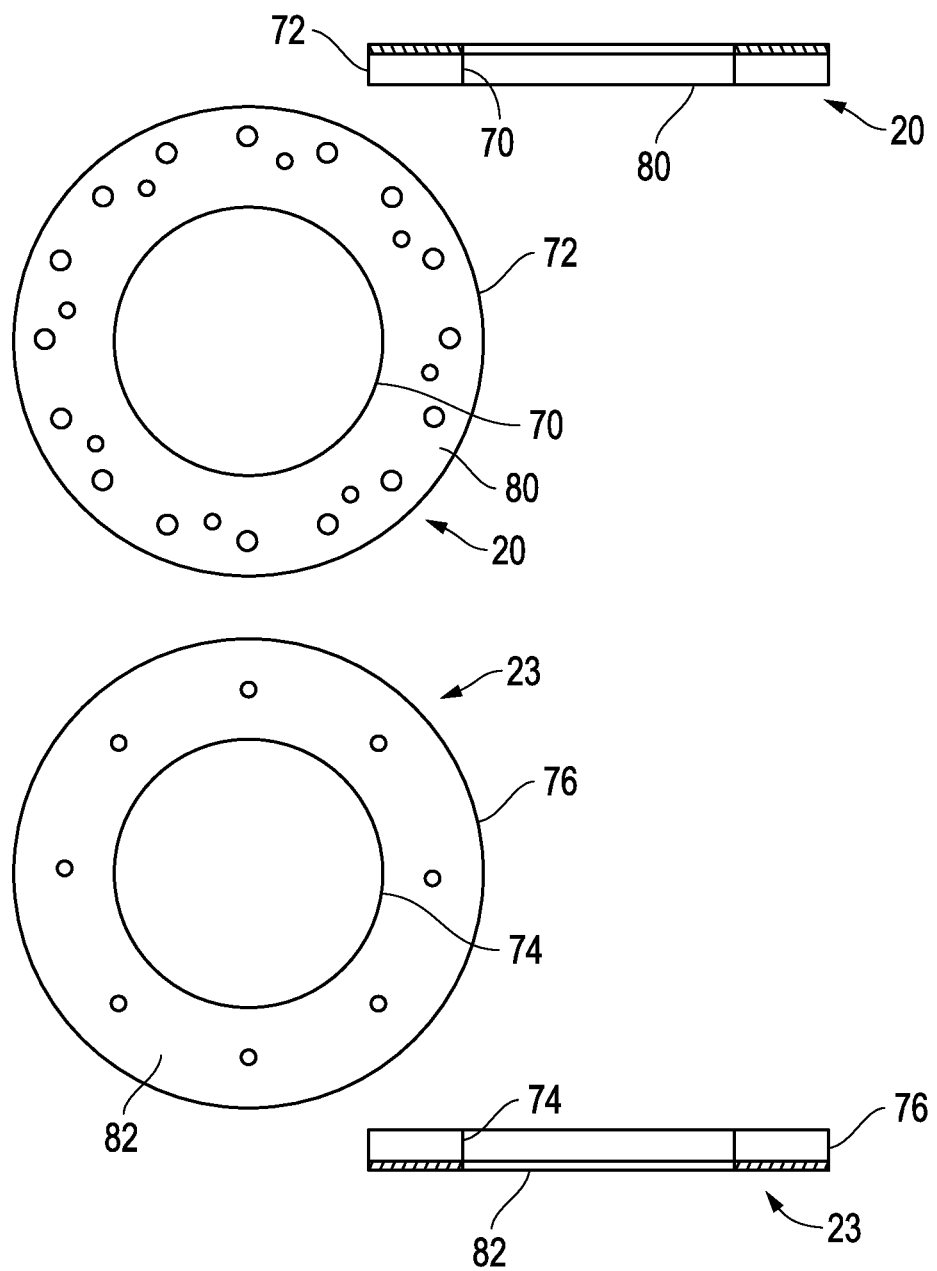
FIG. 8 shows both plan and elevation views of the two ends of the outer and inner support structures for the filter.

Referring now to FIG. 8, the top end cap 20 includes an 11-gauge by two inch wide stainless steel inner perimeter lip ring 70, an 11-gauge by two inch wide stainless steel outer perimeter lip ring 72, and a one-inch thick stainless steel metal plate, which is a top end cap base 80. The bottom end cap 23 includes an 11-gauge×2 inch wide stainless steel inner perimeter lip ring 74, an 11-gauge×2 inch wide stainless steel outer perimeter lip ring 76, and a three-quarter-inch thick stainless steel metal plate, which is a bottom end cap base 82.

Figure 9A:
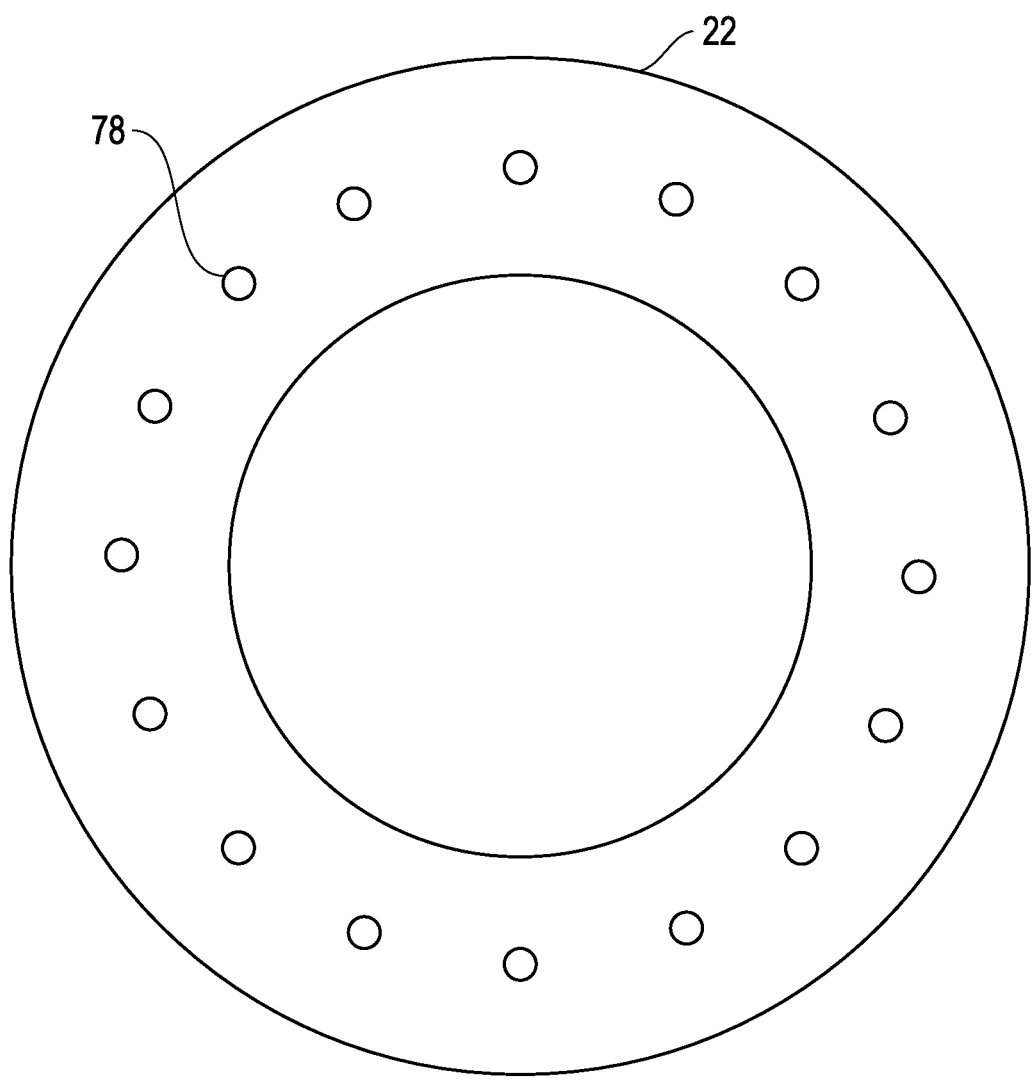
FIG. 9A is a plan view of the bottom of the outer support structure for the filter.

Referring now to FIG. 9A, threaded bolt holes 78 are machined into the top flange plate 22 to fasten the top end cap base 80 to the top flange plate 22 with the bolts 28.

Figure 9B:
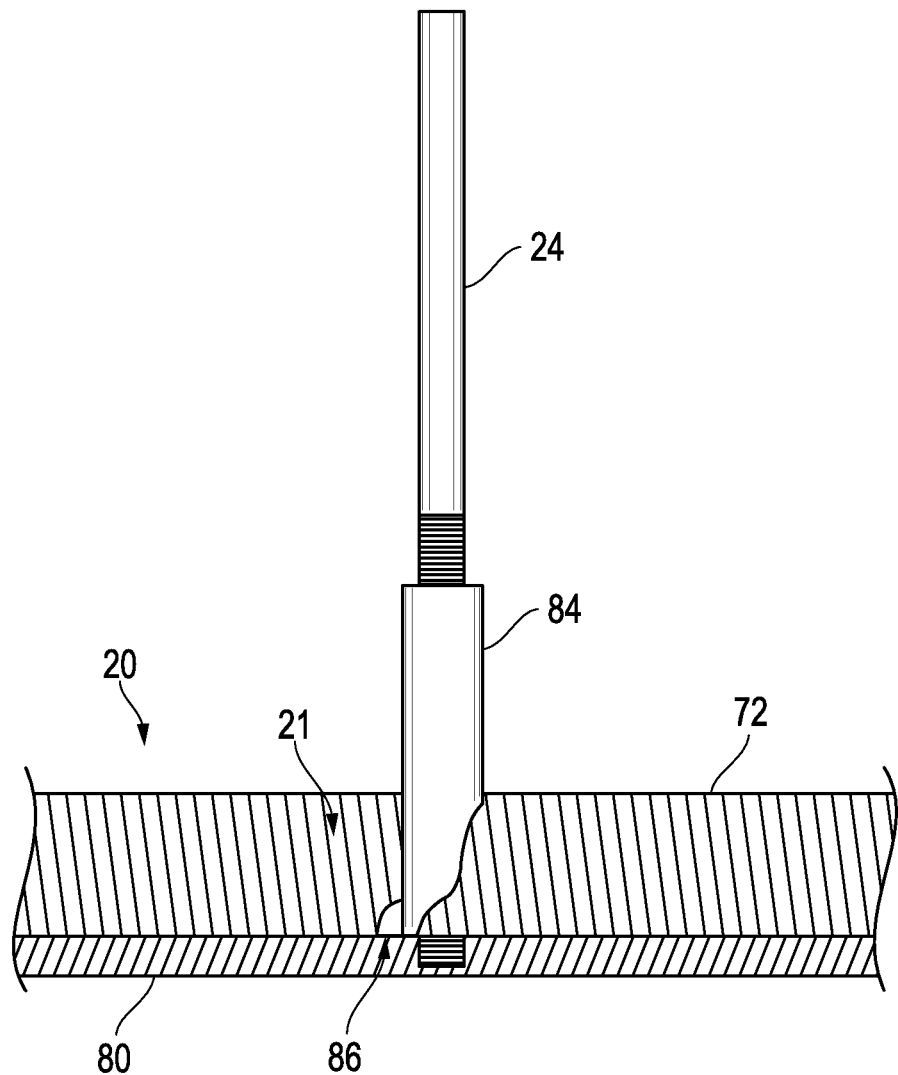
FIG. 9B shows a round bar inserted through a tubular member, which is welded to the horizontal surface of the top end cap of the filter.

Referring to FIG. 9B, a ⅝ inch O.D. stainless steel tubular fixture 84 is seal welded at its lower perimeter by a weld 86 to the top end cap base 80 on the interior of the top end cap 20 adjacent to the outer perimeter lip ring 72 and centered over the threaded bolt holes 78 in the top end cap base 80 in a pattern that will align with the lay-out of the cap tie rods 24. The adhesive sealant 21 is then poured into the top end cap 20 encircling the tubular fixture 84, encapsulating it to a depth equivalent to the height of the outer perimeter lip ring 72 with the encapsulation extending to and rising level with the inner perimeter lip ring 70.

Figure 9C:
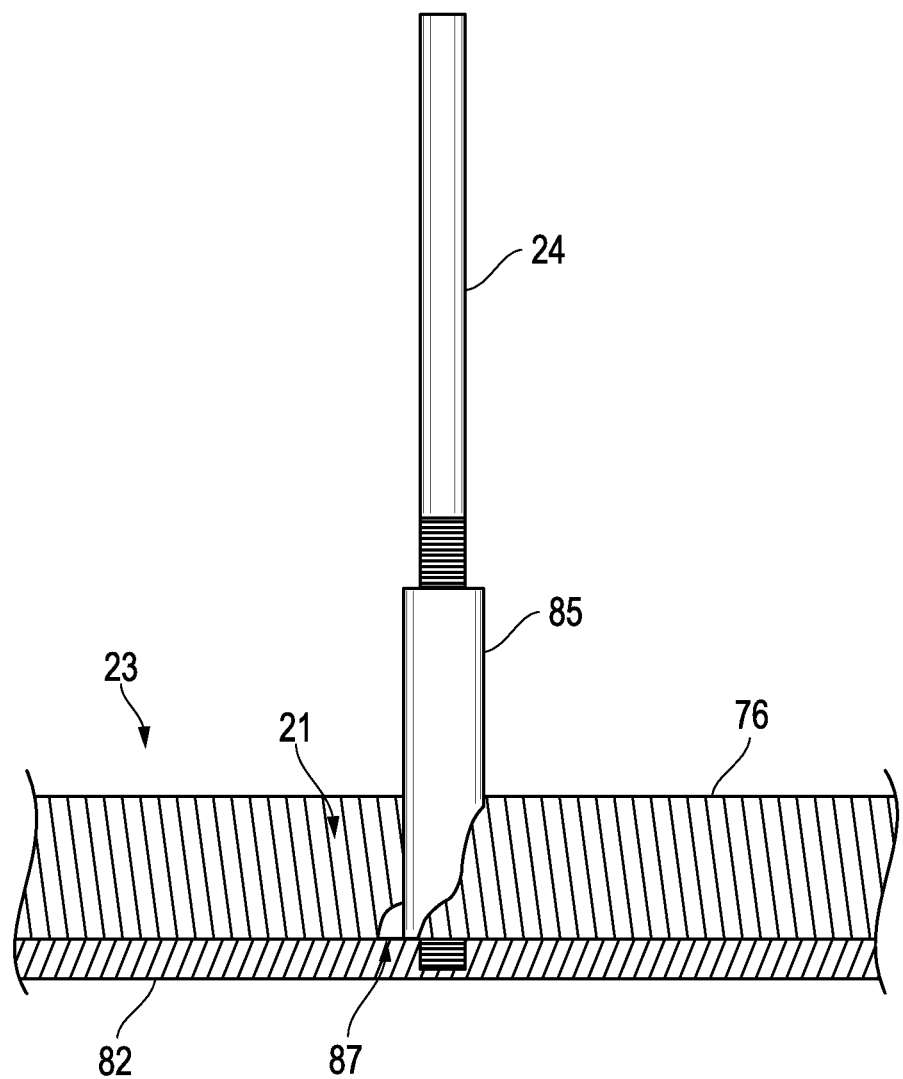
FIG. 9C shows a round bar inserted through a tubular member, which is welded to the horizontal surface of the bottom end cap of the filter.

Referring to FIG. 9C, a ⅝ inch O.D. stainless steel tubular fixture 85 is seal welded at its lower perimeter by a weld 87 to the bottom end cap base 82 on the interior of the bottom end cap 23, adjacent to the bottom end cap outer perimeter lip ring 76, and centered over the threaded bolt holes 78 in the bottom end cap base 82 in a pattern that will align with the lay-out of the tie rods 24. The adhesive sealant 21 is then poured into the end cap 23, encircling the tubular fixture 85, encapsulating it to a depth equivalent to the height of the bottom end cap outer perimeter lip ring 76, with the encapsulation extending to and rising level with the bottom end cap inner perimeter lip ring 74.

Figure 10:
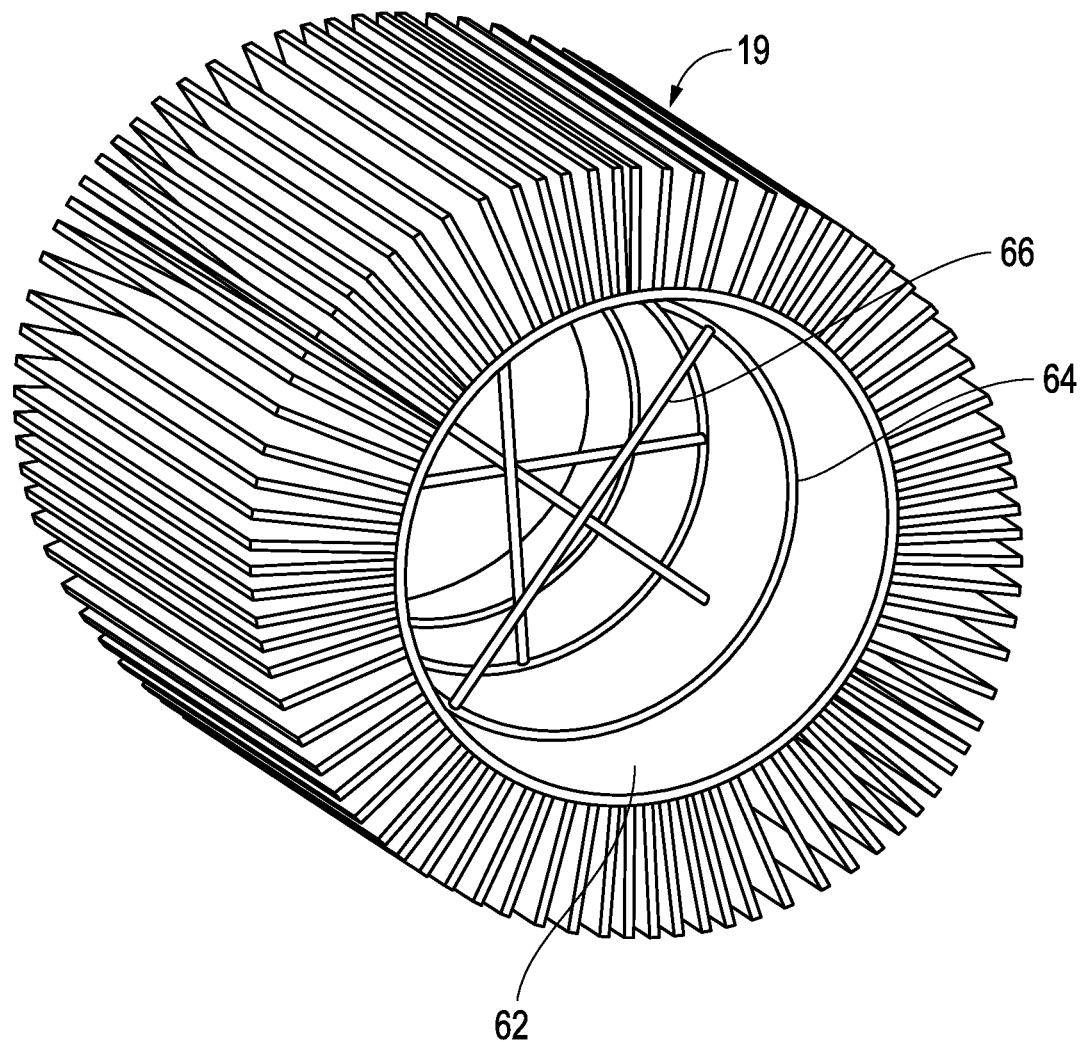
FIG. 10 shows the filter media attached to the perforated core of the filter.

Referring to FIG. 10, the filter media 19 is shown attached to the perforated core 62, which contains the rings 64 with the cross-braces 66 welded to the rings 64 in cross configuration, as also shown in FIG. 5.

Figure 11:
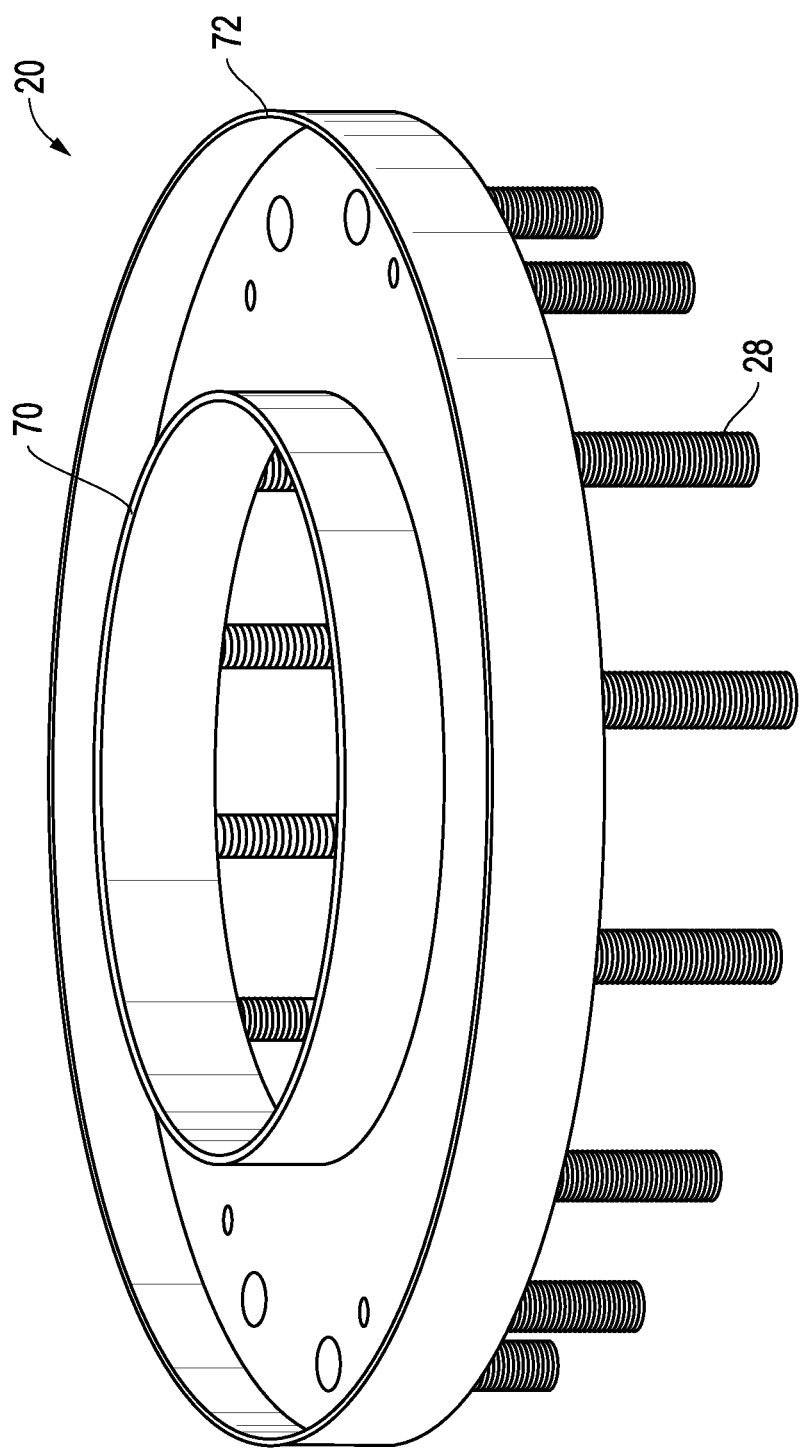
FIG. 11 shows the top end cap of the filter.

Referring to FIG. 11, the top end cap 20 includes the inner perimeter lip ring 70 for aligning the perforated core 62, the outer perimeter lip ring 72, and the stud bolts 28 that fasten the top end cap base 80 to the top flange plate 22.

Figure 12:
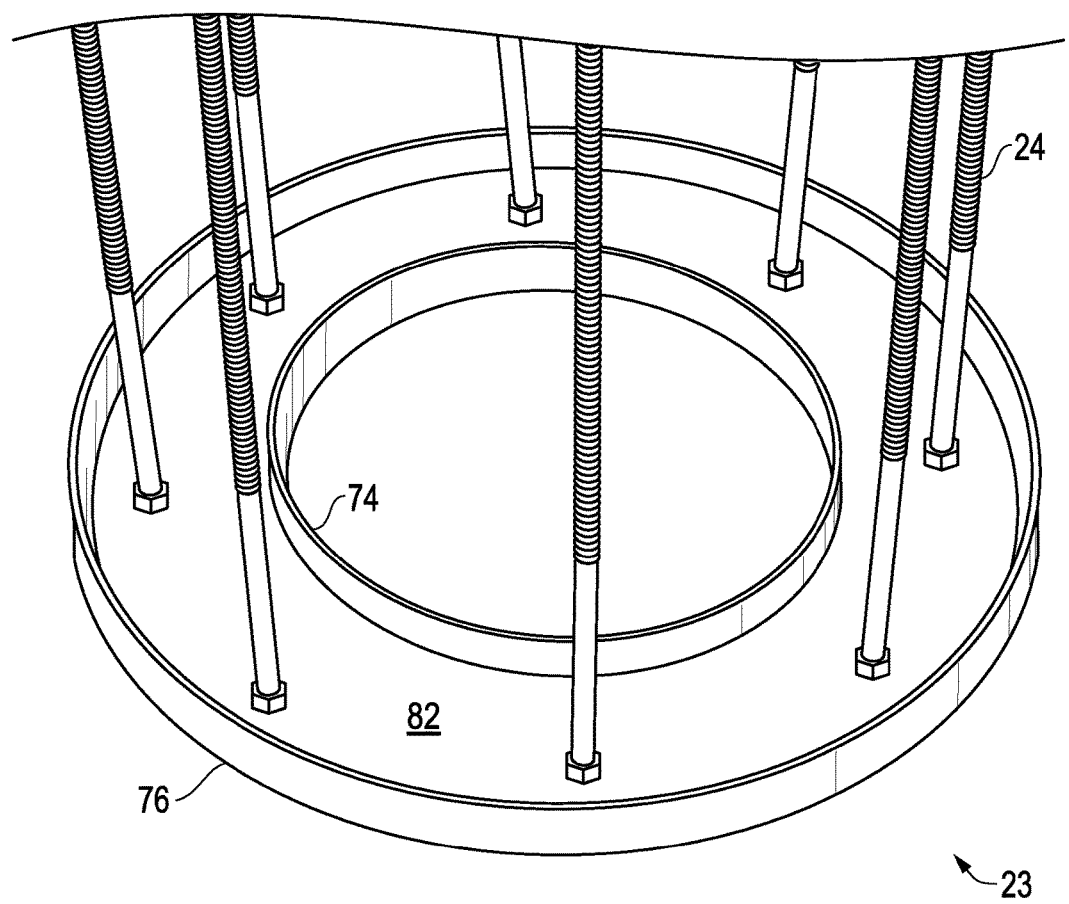
FIG. 12 shows the bottom end cap of the filter.

Referring to FIG. 12, the bottom end cap 23 includes the inner perimeter lip ring 74, for aligning the perforated core 62, and the outer perimeter lip ring 76, and is shown connected to the tie rods 24 that connect the bottom end cap base 82 to the top end cap base 80 (not shown in FIG. 12).

Figure 13:
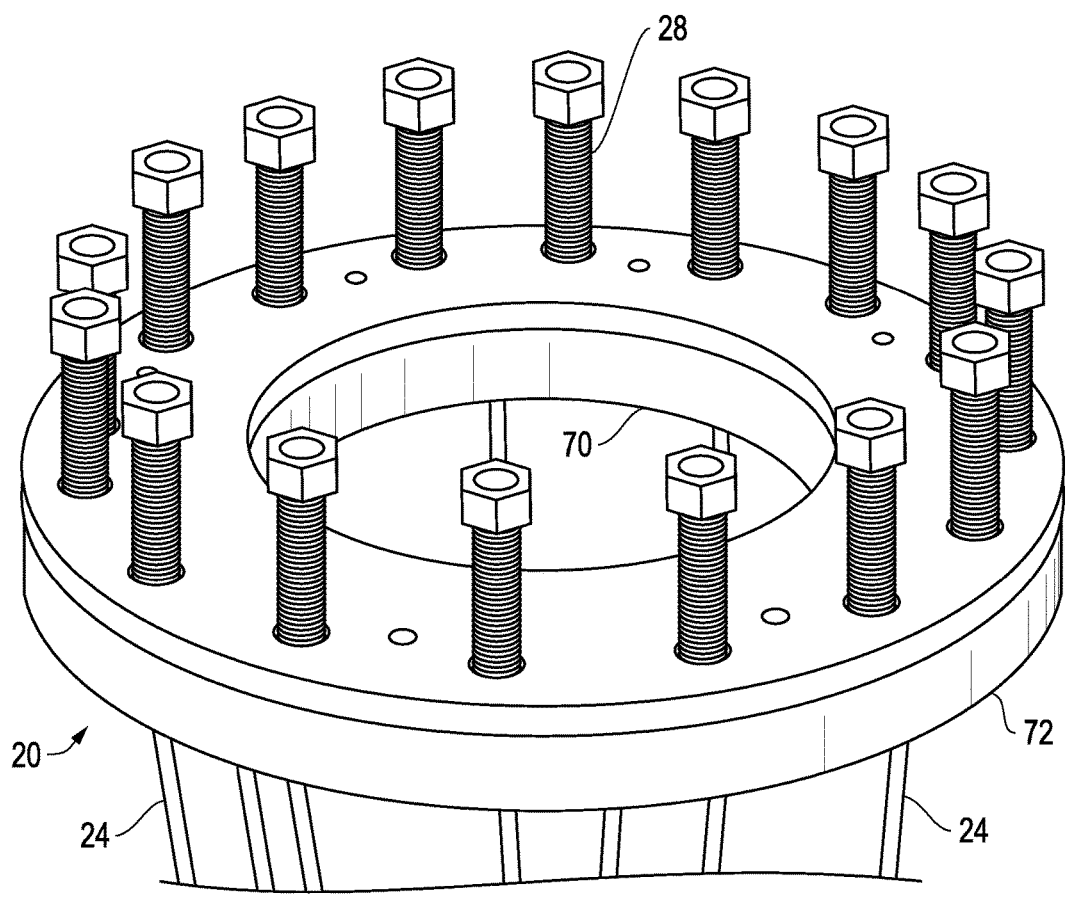
FIG. 13 shows the top end cap connected to the round bar tie rods that connect the bottom end cap to the top end cap.

Referring to FIG. 13, the top end cap 20, including the inner perimeter lip ring 70, the outer perimeter lip ring 72, and the bolts 28, is shown connected to the tie rods 24 that connect the bottom end cap base 82 to the top end cap base 80 (not shown in FIG. 13).

Figure 14:
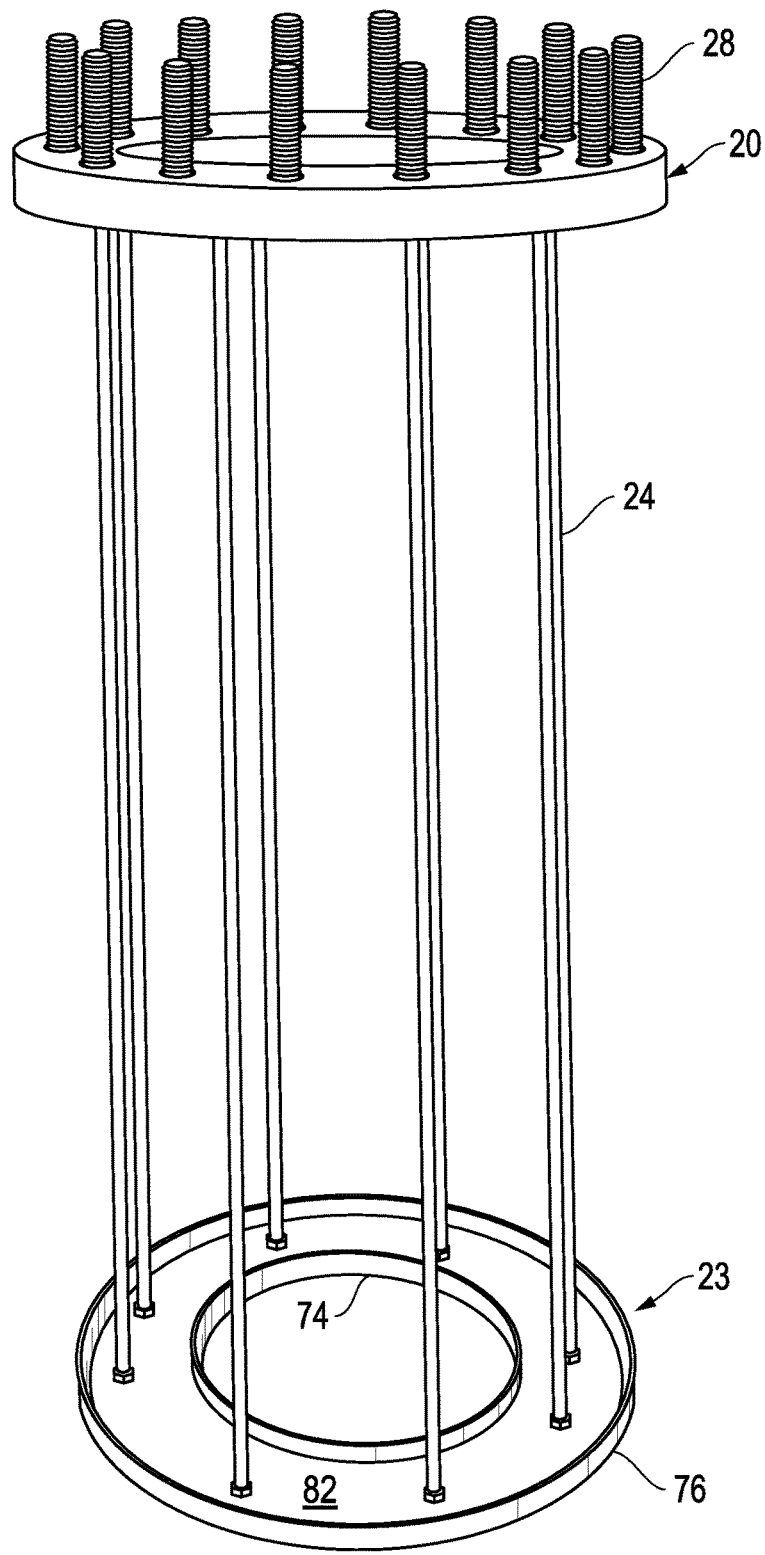
FIG. 14 shows the bottom end cap attached by the round bar tie rods to the top end cap.

Referring to FIG. 14, the bottom end cap base 82, with the inner perimeter lip ring 74 and the outer perimeter lip ring 76, is shown attached by the tie rods 24 to the top end cap 20.

Figure 15:
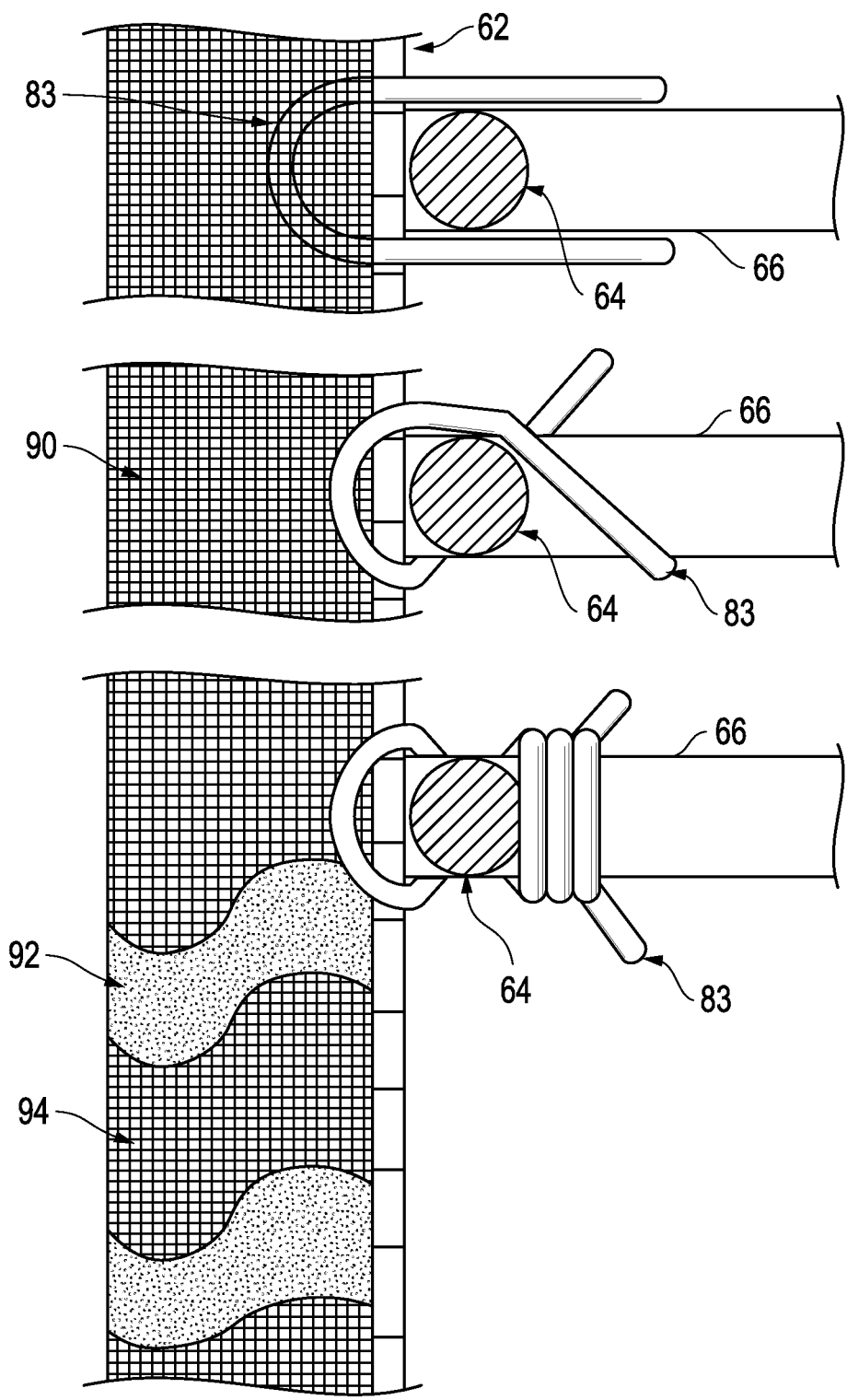
FIG. 15 shows the perforated core of the filter, welded to reinforcement rings and cross brace supports, and having tie wires inserted through the bottom of the first layer of the pleated wire media.

Referring to FIG. 15, the perforated core 62 is shown welded to the rings 64 and the cross-braces 66 are welded to the rings 64. The first layer 90 of the three layer filter media 19, is shown attached to the perforated core 62 by inserting the tie wire 83 through the bottom of the pleat depth of the first layer 90 adjacent to the perforated core 62, where the cross-braces 66 intersect and are welded to the rings 64. The tie wire 83 has a minimum tensile strength of 267 KSI. The tie wire 83 is shown inserted and manually twisted around the ring 64 and the cross-brace 66 with a minimum of four twists per inch, and a maximum of nine twists per inch. The tie wire 83 is applied at every intersection of the cross-braces 66 with the rings 64. In the preferred embodiment the rings 64 and the cross-braces 66 are equally spaced at a maximum of 10 inches on the perforated core 62. In addition, the cross-braces 66 are shown welded to the rings 64, welded inside the perforated core 62 with the tie wire 83 tied to the first layer 90. A middle layer of stainless steel micronic filter cloth 92 has a mesh count of 165×1400 with wire diameters of 0.0028 inch in the warp direction and 0.0016 inch diameter in the shute direction. The filter cloth 92 has an absolute rating of 16 microns and a nominal rating of 10 microns. A 20 mesh 0.014 inch wire diameter stainless steel woven wire metal mesh 94 is the outer layer of the filter media 19.

According to the manufacturing process of the present invention, the process has been optimized to calculate the proper size of a filter needed for a given process. With a known process stream fluid specification (including but not limited to specific gravity, viscosity, required micron retention, allowable pressure drop, line size, operating pressure, and operating temperature) and a required flow rate, the required surface area of the filter media 19 can be obtained based on manufacturers efficiency ratings for the specific micron rated metal woven wire media that will satisfy process conditions.

The following definitions apply for the three equations listed below:

D is the inside diameter of the perforated core 62. On a retrofit application, D must not exceed thirteen inches less than the inside diameter of the existing process vessel. This maximum D allows a four-inch pleat depth, plus five inches for end cap outside diameter allowance and vessel wall spacing factors.

C is the circumference in inches of the perforated core 62.

P is the pleat depth in inches of the filter media 19. The maximum pleat depth for micron rated metal woven wire is four inches. In the preferred embodiment the minimum pleat depth is four inches.

N is the number of pleats per inch of the circumference of the perforated core 62. The maximum number of pleats for micron rated metal woven wire is four pleats per inch of circumference. In the preferred embodiment the minimum pleats per inch is 3.5.

H is the pleat height. The maximum industry standard pleat height for micron rated metal woven wire is forty-eight inches. In the preferred embodiment the minimum pleat height is sixty inches.

S is the surface area of the filter media 19.

$C = \pi D$ $4C = N$ $(2P)NH = S$

D affects C by a factor of pi (3.14159), which in the next step affects N by a factor of 4. When this factor (now 12.5664) is applied to P, which by limitation is a maximum of 8, then the figure of 100.53 becomes a constant against H, which (again by limitation) is 48. The new formula constant is now 4,825.4976. This figure represents square inches, so when divided by 144, the number 33.51 (in square feet) is obtained as the surface area constant. In the preferred embodiment the H factor changes to 60 and the formula constant is 6,031.872. When divided by 144, the number 41.88 (in square feet) is obtained as the surface area constant.

Thus, the selection of the size of the inside diameter of a process vessel 10 depends on the inside diameter of the perforated core 62. As an example, if flow rate calculations dictate a required square footage of filter cloth to be 1,000 square feet, then 1,000 sq. ft. divided by 33.51 yields a 29.84 inch inside diameter for the perforated core 62. When this figure is added to the thirteen-inch minimum clearance requirement for the process vessel 10, the minimum inside diameter of the process vessel 10 is 42.84 inches. In the preferred embodiment the 1,000 square feet is divided by 41.88, which yields a minimum inside diameter of the process vessel 10 as 23.88 inches.

Conversely, for a known size of a process vessel 10, one deducts thirteen inches from the inside diameter of the process vessel 10, and then multiplies that figure by 33.51. As an example, if the process vessel 10 has an inside diameter of thirty-six inches, this would factor as a twenty-three inch inside diameter of the perforated core 62, which when multiplied by 33.51 would equal 770.73 square feet of surface area available, assuming that the vertical clearance in the process vessel 10 will accommodate the height of the filter media 19. When the available surface area is known, then a maximum flow rate can be established for the vessel with inlet and outlet nozzle limitations being the only other factors. In the preferred embodiment for a process vessel with an inside diameter of thirty-six inches and a deduction of thirteen inches, yielding a twenty-three inch inside diameter of the perforated core 62, is then multiplied by 41.88, which equals 963.24 square feet of surface area.

The invention claimed is:

1. A removable, reusable, pleated woven wire filter, configured for removing particulate material from a heavy coker gas oil process stream, the filter comprising:
    a. A reinforced 11-gauge stainless steel perforated core having one-half-inch stainless steel round bar reinforcement rings welded to one-half-inch stainless steel round bar cross bars to create bar-ring junctures, and having 11-gauge stainless steel attachment clips welded to each end of the perforated core;
    b. a three-layer stainless steel pleated woven wire filter media wrapped around the perforated core, attached to the perforated core by 18-gauge stainless steel tie wires at each of the bar-ring junctures; and further attached at each end of the perforated core by attachment clips welded to each open end of the perforated core; the filter media having spaced apart pleats with external peaks, and an external filter media surface comprising the external peaks of the pleats;
    c. a stainless steel flattened expanded metal shroud adjacent to and encircling the external peaks, and
    d. a one-inch-thick stainless steel top end cap base and a three-quarter-inch-thick stainless steel bottom end cap base connected to the metal shroud, both cap bases sealed against top and bottom ends of the filter media with a stainless steel adhesive sealant rated at 2,000 degrees Fahrenheit,
    wherein the wire filter is further adapted for filtering a process stream operating between 300 and 800 degrees Fahrenheit, and between 150 psig and 500 psig, and
    is further adapted for being backwashed with a backwash purge pressure that can vary from 100 psig to 200 psig.

2. The filter of claim 1, wherein the filter media consists of:

a. an inner layer of a woven wire metal mesh, comprising eight-mesh, stainless steel, 0.025 inch diameter wire;
b. a middle layer of woven wire micronic filter cloth, comprising a mesh count per inch of 165×1400 stainless steel; and
c. an outer layer of a woven wire metal mesh, comprising 20-mesh, stainless steel, 0.014 inch diameter wire;
and wherein the inner and outer layers support the filter cloth.

3. The filter according to claim 1, wherein the attachment clips are spaced-apart at each circumferential open end of the perforated core, and are bent radially outward and then inward, squeezing the filter media against the perforated core.

4. The filter of claim 1, wherein the pleated woven wire filter media has a maximum of 4 pleats per inch.

5. The filter of claim 1, wherein the pleated woven wire filter media has a minimum of 3.5 pleats per inch.

6. The filter of claim 1, wherein the pleated woven wire filter media has a maximum pleat depth of 4 inches.

7. The filter of claim 1, wherein the pleated woven wire filter media has a minimum pleat depth of 4 inches.

8. The filter of claim 1, wherein the pleated woven wire filter media has a minimum pleat height of 60 inches.

9. The filter of claim 1, wherein the pleated woven wire filter media has a pleat height of 48 inches.

\* \* \* \* \*